United States Patent [19]

Takeshita

[11] 3,963,772
[45] June 15, 1976

[54] ALTERNATING ALKYLENE/ACRYLIC TELOMERS

[75] Inventor: Tsuneichi Takeshita, Newark, Del.

[73] Assignee: E. I. Du Pont de Nemours and Company, Wilmington, Del.

[22] Filed: Feb. 9, 1973

[21] Appl. No.: 331,208

[52] U.S. Cl. .................. 260/485 H; 260/465 B; 260/465 C; 260/465 D; 260/465 H; 260/465 K; 260/465.3; 260/465.4; 260/465.7; 260/469; 260/475 SC; 260/476 R; 260/486 H; 260/487
[51] Int. Cl.² .................................... C07C 69/34
[58] Field of Search ........ 260/485 H, 485 F, 486 H, 260/487 R

[56] References Cited
UNITED STATES PATENTS

| | | | |
|---|---|---|---|
| 3,183,217 | 5/1965 | Serniuk et al. | 260/85.5 R |
| 3,742,019 | 6/1973 | Vofsi et al. | 260/485 H |
| 3,793,262 | 2/1974 | Logethetis | 260/86.7 |
| 3,843,734 | 10/1974 | Trebillon | 260/487 |

OTHER PUBLICATIONS

Rosin et al., J. Appl. Polym. Sci., 1972, 16(7) pp. 1687–1700.

*Primary Examiner*—Lorraine A. Weinberger
*Assistant Examiner*—Jane S. Myers

[57] ABSTRACT

Liquid alkylene/acrylic telomers predominantly terminated with functional groups are prepared from acrylic and lower alkylene units by carrying out the polymerization in the presence of a Lewis acid halide and an organic halide.

1 Claim, No Drawings

ALTERNATING ALKYLENE/ACRYLIC TELOMERS

BACKGROUND OF THE INVENTION

Elastomeric polymers have recently been made available to the industry which exhibit a desirable combination of low temperature properties and resistance to oil and oxidation. These compositions, described in detail in Logothetis, U.S. Patent application Ser. Nos. 233,741, now U.S. Pat. No. 3,925,326, and 230,483, now U.S. Pat. No. 3,793,262 hereby incorporated by reference, exhibit a glass transition temperature lower than about 0°C. and a relatively high inherent viscosity. These polymers are the result of the discovery that the indicated desirable combination of properties can be obtained through copolymers having alternating units of ethylene and alkyl acrylates.

However, certain specialized applications of elastomeric compositions would benefit from polymers of this type in a normally liquid state, with reactive groups terminating both ends of the relatively short chain molecules. Such compositions, for example, would be particularly useful in the formulation of high molecular weight rubbers after the incorporation of additives.

SUMMARY OF THE INVENTION

The present invention provides a process for the preparation of telomers of alkylene and acrylic monomers which results in short-chain alternating copolymers substantially terminated at one end of the polymer chains with the more reactive alkylene units.

The telomers of the present invention are normally liquid and have the structural formula $X(D-A)_n CR_1 R_2 R_3$; wherein X is selected from Br, I and Cl; wherein $R_1$ is selected from Cl, Br, I, $CO_2H$, $C_6H_4CH_2Cl$ and $CH=CH_2$; and $R_2$ and $R_3$ are independently selected from hydrogen, Cl, Br, I, $CO_2H$, $C_6H_5$ and $CH=CH_2$; X, $R_1$, and $R_2$ and $R_3$ being selected in a manner such that the composition

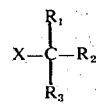

would exhibit a $C_s$ (styrene) value of at least 0.00005 at 60°C.; wherein D is $-CH_2-CR_4R_5-$, wherein $R_4$ and $R_5$ are independently selected from H, Br, Cl, alkyl having a length of 1 to 22 carbon atoms and aryl of from 6 to 14 carbon atoms; wherein A is

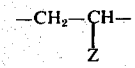

wherein Z is selected from $-CO_2R_6$ and $-CN$, wherein $R_6$ is alkyl of 1 to 8 carbon atoms; and wherein $n$ is an integer large enough to give a molecular weight of about from 300 to 50,000.

The instant invention also provides an improvement in the telomerization of a donor alkylene monomer, and a polar acceptor acrylic monomer containing conjugated carbon-heteroatom unsaturation, the heteroatom being selected from O and N, and about 0.5 to 1.0 moles (per mole of polar acceptor monomer) of a Lewis acid halide selected from the halides of Zn, Cd, Hg, B, Al, Ga, In, and Tl, the improvement which comprises carrying out the reaction in the presence of an organic halide having the following structural formula:

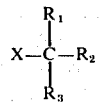

wherein X is selected from Br, I and Cl and wherein $R_1$ is selected from Cl, Br, I, $CO_2H$, $C_6H_4CH_2Cl$ and $CH=CH_2$; and $R_2$ and $R_3$ are independently selected from hydrogen, Cl, Br, I, $CO_2H$, $C_6H_5$, and $CH=CH_2$; the organic halide having a $C_s$ (styrene) value of at least 0.00005 at 60°C. and predominantly undergoing chain transfer with the donor olefin.

DETAILED DESCRIPTION OF THE INVENTION

Donor alkylene monomers which can be used in the process of the instant invention include those having the structural formula $CH_2=CR_1R_2$ wherein $R_1$ and $R_2$ are independently selected from H, Br, Cl, alkyl having a length of 1 to 22 carbon atoms and aryl of from 6 to 14 carbon atoms. Of these, to maintain the lowest glass transition temperature of the polymeric material, lower alkylene having 2 to 5 carbon atoms, and especially ethylene, is preferred.

Polar acceptor monomers that can be used in the present invention can be selected from those containing conjugated C—O or C—N unsaturation. Representative compounds of this type include acrylate esters such as methyl acrylate and ethyl acrylate; and acrylonitrile. These compounds preferably are those of the structural formula $CH_2=CH-CO_2R$ wherein R is selected from lower alkyl of 1 to 8 carbon atoms. Of these, ethyl acrylate and butyl acrylate are particularly preferred because the polymers resulting from these monomers exhibit an exceptionally good combination of oil resistance and low glass transition temperature.

The polymerization of the donor olefin and the polar acceptor is carried out in the presence of 0.5 to 1.0 moles, per mole of acceptor, of a Lewis acid halide. Lewis acid halides which can be used in the instant invention include the halides of Zn, Cd, Hg, B, Al, Ga, In and Tl. A particular Lewis acid halide compound especially convenient in the instant process is boron trifluoride. It is generally preferred to have a quantity of the Lewis acid which is equimolar to the polar acceptor monomer. Less than a stoichiometric amount of the Lewis acid halide is less desirable because the regular alternation of the polymer is disturbed and termination with the acceptor monomer may occur. Amounts in excess of the preferred equimolar quantities generally have little beneficial effect. However, in the case where the organic halide, hereinafter described, also complexes with the Lewis acid, it is desirable to use an amount of Lewis acid sufficient to complex both the organic halide and the acceptor monomer.

The reaction is carried out in an inert solvent which does not react with the reactants or with the product formed. In addition, the solvent must be capable of dissolving the reactants and the telomers formed. Typical solvents which can be used include dichloromethane, dichloroethane, benzene, toluene and chlorobenzene. Dichloromethane and dichloroethane have been found to be particularly convenient with the preferred reactants used in the instant process.

The polymerization reaction is also conducted in the presence of a free radical polymerization initiator, such as an azo-initiator or an organic peroxide. The most effective free radical polymerization initiators for a particular reaction system can be readily determined. Preferred initiators are benzoyl peroxide, azobisisobutyronitrile, and 2,2'-azobis(2-methylpropiolnitrile). The amount of the initiator is generally about from 0.05 to 5.0 parts for every 100 parts by weight of the alkyl acrylate or mixture of acrylic monomers. The amount of the initiator is preferably about 0.1 to about 1.0 parts by weight. The initiator can be added to the reaction mass at the start of the reaction, or gradually as the reaction progresses. It is conveniently dissolved in the inert solvent used in the reaction prior to addition to the reactor.

An important feature of the instant process involves the incorporation of certain organic halides which function as chain transfer agents. These organic halides have at least one halogen that can be readily abstracted during the copolymerization process by a free radical. The reactivity of this halogen should be such as to indicate a $C_s$ (styrene) value of at least 0.00005, the $C_s$ being the ratio of chain transfer to chain propagation for the free radical polymerization of styrene at 60°C. in the presence of the particular organic halide. Details of the determination of this value are well known in the art and are discussed in detail in Polymer Handbook, edited by J. Brandrup and E. H. Iummergut, p. II — 105 – 116, Interscience Publisher, New York, N.Y. (1966), hereby incorporated by reference. The remainder of the organic halide contains a second functional group that can be readily reacted for the purpose of chain extension of the telomers, including a halogen, acid or ester group, or a carbon-carbon double bond. Representative organic halides which can be used in the instant process include the following. The single dashes in the structural formulas segregate the reactive halogens and accordingly indicate the position at which the molecules split in the course of the chain transfer reaction.

| | | |
|---|---|---|
| Br—CCl$_3$ | Br—CH$_2$CO$_2$H | Br—CH$_2$CH=CH$_2$ |
| I—CCl$_3$ | Cl—CH$_2$CO$_2$H | I—CH$_2$CH=CH$_2$ |
| Cl—CCl$_3$ | I—CH$_2$CO$_2$H | Cl—CH$_2$CH=CH$_2$ |
| Br—CBr$_3$ | Br—CHBrCO$_2$H | Br—CH(C$_6$H$_5$)CO$_2$H |
| Br—CH$_2$Br | Cl—CCl$_2$CO$_2$H | Br—C(CH$_3$)$_2$CO$_2$H |
| I—CH$_2$I | Cl—CH$_2$C$_6$H$_4$CH$_2$Cl | |

Of these, BrCH$_2$CO$_2$H, ICH$_2$CO$_2$H, Br$_2$CHCO$_2$H and BrC(CH$_3$)$_2$CO$_2$H have been found particularly satisfactory.

The amount of the organic halide chain transfer agent used in the reaction will vary according to the chain length desired, but will generally comprise about from 0.1 to 5.0 moles of organic halide per mole of acceptor monomer.

The reaction is conducted at about −10° to 200°C., preferably about from 0° to 100°C., and most preferably about from 25° to 50°C. The reaction is run under pressure, the pressure utilized during the reaction being at least sufficient to insure a high concentration of donor monomer in the reaction solution. Generally, pressures of about from 10 psig to 10,000 psig, preferably about 100 – 1,000 psig and, most preferably, about from 100 to 500 psig are used. The reaction time required is a function of temperature, the reaction proceeding faster at higher temperatures. For example, at 25°C. a typical reaction of ethylene and ethyl acrylate will go to completion in about from 60 to 120 minutes after the induction period. The reaction will generally proceed faster at higher temperatures. During the reaction, a drop in pressure occurs as the donor olefin monomer is consumed. Completion of the reaction is evidenced by no further change in donor monomer pressure.

The process of this invention can be operated on either a batch or continuous basis. The particular apparatus to be used in practicing the present process should be selected to withstand the operating temperatures and pressures, and can otherwise be the type generally used in polymerization reactions. It is preferable to agitate the reaction mass in order to obtain a more homogeneous product. In general, the sequence of addition of the reactants involves the simultaneous addition of the acrylic monomer, chain transfer agent, solvent and free radical initiator, after which the Lewis acid halide and the donor monomer are added.

After termination of the reaction, copolymer can be isolated by conventional techniques, such as steam stripping. Another method of isolating the copolymer consists of evaporation of the reaction solvent, after removal of the Lewis acid.

The polymers of the present invention have a desirable combination of characteristics, including regular alternation of the units of the copolymer, a low molecular weight, and reactive groups at both ends of the polymer chain. While the mechanism of the interaction between the various reactants in the process is not fully understood, it is believed to involve a modification of the reactivity of the acceptor monomer toward the organic halide chain transfer agents. It is thought that the complex formed by the polar acceptor and the Lewis acid halide is substantially less susceptible to chain-transfer by the organic halide of the present process, while the radical derived from the donor olefin is much more susceptible to chain transfer. As a result, the desirable combination of low chain length and the appearance of the reactive donor olefin groups at the end of the chain is obtained.

This combination of product characteristics permits the formation of an elastomer which can be handled as a liquid through a substantial percentage of regular elastomer processing operations, permitting the ready incorporation of fillers, additives and the like. Thereafter, after completion of these normally difficult and time consuming processing steps, the reactive groups at the end of the short polymer chain can be used to form substantially longer chains. The alternating characteristic of the units in the copolymer chain, at the same time, provide excellent resistance to hydrocarbon oils and oxidation while retaining excellent low temperature flexibility.

The instant invention is further illustrated by the following specific examples, in which parts, proportions, and percentages are by weight unless otherwise indicated.

The examples illustrate the production of telomeric compositions having the formula Br(D-A)$_n$Y where Y is —CCl$_3$, —CH$_2$Br or —C(CH$_3$)$_2$CO$_2$H.

EXAMPLE 1

Cotelomerizaton of Ethylene and Methyl Acrylate with Trichlorobromomethane in the Presence of Boron Trifluoride A solution of 43 grams methyl acrylate, 100 milliliters ethylene dichloride, 100 milliliters trichlorobromomethane, and 0.1 gram azoisobutyronitrile radical initiator was charged into a 1200 milliliter stainless steel autoclave. The autoclave was cooled with dry ice and evacuated. Forty grams of $BF_3$ were introduced and the autoclave pressurized with ethylene to 100 psi at 16°C.

The resulting reaction mixture was stirred at 16°C. for 21 minutes at which time the pressure had decreased to 50 psi. The mixture was repressurized to 100 psi and maintained at this pressure for about 10 minutes, then the pressure was increased to and maintained at 200 psi at 27° – 33°C. The uptake of ethylene substantially stopped about 90 minutes after the start of the reaction. The reaction mixture was kept at 200 psi ethylene pressure for a total of 6 hours. After venting excess ethylene, 200 milliliters of water were added. The solution was washed with water till neutral and dried over anhydrous sodium sulfate. The volatile materials were removed on a rotary-vacuum evaporator. An oily product was obtained in a yield of 92.1 grams. Analyses gave $\overline{M}_n$ (vapor phase osmometry, $CHCl_3$ 35°C.) 375. Vacuum distillation of a 30-gram portion of the product gave 16.7 grams of colorless oil, b.p. 96°–116°C./0.3 mm Hg. Redistillation using a Vigreux column gave 16.3 grams of a clear colorless fraction boiling at 90° – 92°C./0.04 mm Hg. The analytical data established this fraction ot have the following structure:

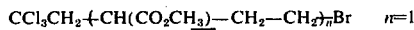
$CCl_3CH_2\text{-}(CH(CO_2CH_3)\text{-}CH_2\text{-}CH_2)_n\text{-}Br$   $n=1$ The analyses were: $\overline{M}_n$ (vapor phase osmometry, $CHCl_3$) 309 (calcd. 312.3); Cl, 34.2% (calcd. 34.1); Br, 24.4% (calcd. 25.5), O, 10.36% (calcd. 10.2); IR (1735 cm-1 ester carbonyl, 700, 800 cm-1 $CCl_3$—). The proton NMR spectrum was also compatible with the assigned structure.

The structure was further confirmed by a pyrolytic reaction. Heating of the telomer ($n=1$) at 200°C. for 1 hour resulted in the loss of $CH_3Br$ to form a γ-lactone.

Analyses of the lactone gave Br, 0%; Cl, 48.4%; (calcd. 48.9); $\overline{M}_n$ (VPO) 218 (calcd. 217.4), Mass p+ 216; m.p. 53°–54°C.

EXAMPLE 2

The general procedure of Example 1 was repeated except that the ethylene pressure was 600 psi. The product was 62.6 grams of yellow oil. Analyses gave $\overline{M}_n$ (VPO, $CHCl_3$) 407; Cl, 27.1% (calcd. 26.1); Br, 19.6%, (calcd. 19.6). Thin layer chromatography on silica gel (Brinkmann Inst. Inc., Cantiague Rd., Westbury, N.Y. 11590, Silplate - P20F-22; thickness 2.0 mm 20 × 20 cm), using methylene chloride as an eluant, separated the telomer product into five spots. Spot 1 ($R_f$ = distance traveled by solute/distance traveled by solvent = 0.65 – 0.78), Spot 2 (0.43 – 0.59), Spot 3 (0.16 – 0.31), Spot 4 (0.1 – 0.16), Spot 5 (0–0.1). Analytical data are summarized below.

| | T.L.C. Fractionation of $CCl_3\text{-}(CH_2\text{-}CH(CO_2CH_3)\text{-}CH_2\text{-}CH_2)_n\text{-}Br$ ($M_n$=407, Cl 26.1%, Br 19.6%) | | | | | | | |
|---|---|---|---|---|---|---|---|---|
| Spots | % Yd | $\overline{M}_n$ Found | $\overline{M}_n$ Calcd. | n | % Cl Found | % Cl Calcd* | %Br Found | % Br Calcd. |
| 1 | 54 | 336 | 312.2 | 1 | 33.1 | 31.7 | 26.3 | 23.8 |
| 2 | 12 | 424 | 426.5 | 2 | 24.5 | 25.0 | 19.5 | 18.8 |
| 3 | 7 | 511 | 540.6 | 3 | 20.5 | 19.7 | 16.7 | 14.8 |
| 4 | 4 | 618 | 654.7 | 4 | 17.9 | 17.3 | 12.2 | 12.9 |
| 5 (origin) | 6 | 1022 | 997.0 | 7 | 9.9 | 10.4 | 7.8 | 7.8 |

*($3Cl/\overline{M}_n$)

These fractions showed no sign (IR, NMR) of the presence of the end group —$CH_2CH(CO_2R)$—Br.

EXAMPLE 3

Cotelomerization of Ethylene and Butyl Acrylate with Bromoisobutyric Acid in the Presence of Boron Trifluoride A solution of 64 grams butyl acrylate, 28 grams bromoisobutyric acid, 550 milliliters methylene chloride, and 1.5 grams azoisobutyronitrile was charged into an autoclave, followed by the addition of 44 grams $BF_3$ and pressurizing with ethylene to 300 psi. The reaction was run for a total of 6 hours at 300 psi and a temperature of 30° – 50°C. The product was isolated and purified by washing with ice water, with dilute sodium bicarbonate solution, and with water till neutral, then drying over anhydrous sodium sulfate. Evaporation of the solvent on a rotary evaporator gave 95.4 grams of reddish oil. The red color was removed by dissolving the product in 400 milliliters of hexane and washing with 400 milliliters of a dilute sodium thiosulfate-sodium bicarbonate solution (4 grams $Na_2S_2O_3$ + 0.4 gram $NaHCO_3$ aqueous solution), followed by washing with 400 milliliters of dilute hydrochloric acid (2 milliliters conc. HCl/100 milliliter water), and with three 400-milliliter portions of water. After drying over anhydrous sodium sulfate and removing the solvent, 84.9 grams of orange colored oil were obtained. Analyses gave $\overline{M}_n$ (VPO) 970; η 0.54 (1.0 gram/100 milliliters

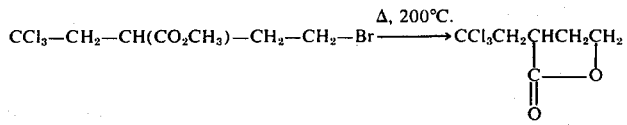
$$CCl_3\text{-}CH_2\text{-}CH(CO_2CH_3)\text{-}CH_2\text{-}CH_2\text{-}Br \xrightarrow{\Delta,\ 200°C.} CCl_3CH_2\overset{\phantom{|}}{C}HCH_2CH_2$$
with the C—O forming a lactone ring (C=O)

CHCl₃, 30°C.); Br, 8.5% (calcd. 8.3); —CO₂H, 0.88 meq/gram; O, 19.2%. The proton NMR shows —CH₂—CH₂—Br (3.5 ppm) end groups, rather than the CH₂—CH(CO₂Bu)—Br (4.2 ppm) end groups.

EXAMPLE 4

Cotelomerization of Ethylene and Butyl Acrylate with Methylene Bromide in the Presence of Boron Trifluoride The reaction procedure of Example 1 was repeated, using 70 milliliters butyl acrylate in 250 milliliters methylene bromide and 250 milliliters ethylene dichloride with 0.5 grams azoisobutyronitrile for 6 hours in the presence of 34 grams BF₃ at an ethylene pressure of 200 psi and a temperature of 30 ± 5°C. After isolation and purification of the product, 80 grams of thick grease-like product was obtained. Analyses gave $\overline{M}_n$ (VPO) 9,630; Br, 1.8% (calcd. 1.7%); O, 19.7% (calcd. 20.5).

EXAMPLE 6

Cotelomerization of Ethylene and Acrylonitrile with Trichlorobromomethane in the Presence of Boron Trifluoride A solution of 33 milliliters of acrylonitrile, 100 milliliters of ethylene dichloride, 100 milliliters of trichlorobromomethane, and 0.1 gram of azoisobutyronitrile was reacted, in a manner similar to the procedure of Example 1, with 34 grams of BF₃ at an ethylene pressure of 200 psi and at a temperature of 40° – 50°C. for 6 hours. After the usual work-up the product was freed from some insoluble materials to yield 6.0 grams of yellow oil. The proton NMR spectrum of a vacuum distilled fraction (b.p. 95° – 102°C./1.0 mm Hg) indicated no —HC(CN)Br end groups. Analyses found $\overline{M}_n$ 283; Cl, 35.7%; Br, 29.6%; N, 5.1%. For the structure of CCl₃—CH₂—CH(CN)—CH₂—CH₂—Br calculated values are $\overline{M}_n$ 279; Cl, 38.2%; Br, 28.7%; N, 5.1%.

EXAMPLE 7

Cotelomerization of Propylene and Methyl Acrylate with Trichlorobromomethane in the Presence of Boron Trifluoride A solution of 43 grams methyl acrylate, 100 milliliters ethylene dichloride, 100 milliliters trichlorobromomethane, and 0.1 gram azoisobutyronitrile was mixed with 17 grams BF₃, and cotelomerization was carried out with propylene at a pressure of 50 psi for 6 hours at 20 ± 5°C. The product was isolated and purified using the procedures of Example 1, and 40.3 grams of yellow oil was obtained. Distillation of 20 grams of the product gave a 53% yield of a fraction boiling at 80° – 115°C./0.5 mm Hg. Analyses gave $\overline{M}_n$ (VPO) 322; Cl, 26.3%; Br, 20.1%; Cl/Br calcd. 1.33, fnd 1.31. The identification of the end-group —CH(CH₃)—Br was confirmed by the NMR spectrum.

I claim:

1. A liquid telomeric composition of the structural formula Br(D—A)ₙY where Y is —CCl₃, —CH₂Br or —C(CH₃)₂CO₂H, wherein D is —CH₂—CR₄R₅—, R₄ and R₅ are independently selected from H, Br, Cl and alkyl having a length of 1 to 22 carbon atoms, and A is

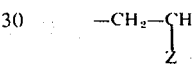

where Z is selected from —CO₂R₆ where R₆ is an alkyl of 1 to 8 carbon atoms, and wherein n is an integer large enough to give a molecular weight of about 300 to 50,000.

* * * * *